No. 817,802. PATENTED APR. 17, 1906.
J. W. PITTOCK.
WASHING APPARATUS.
APPLICATION FILED SEPT. 12, 1905.
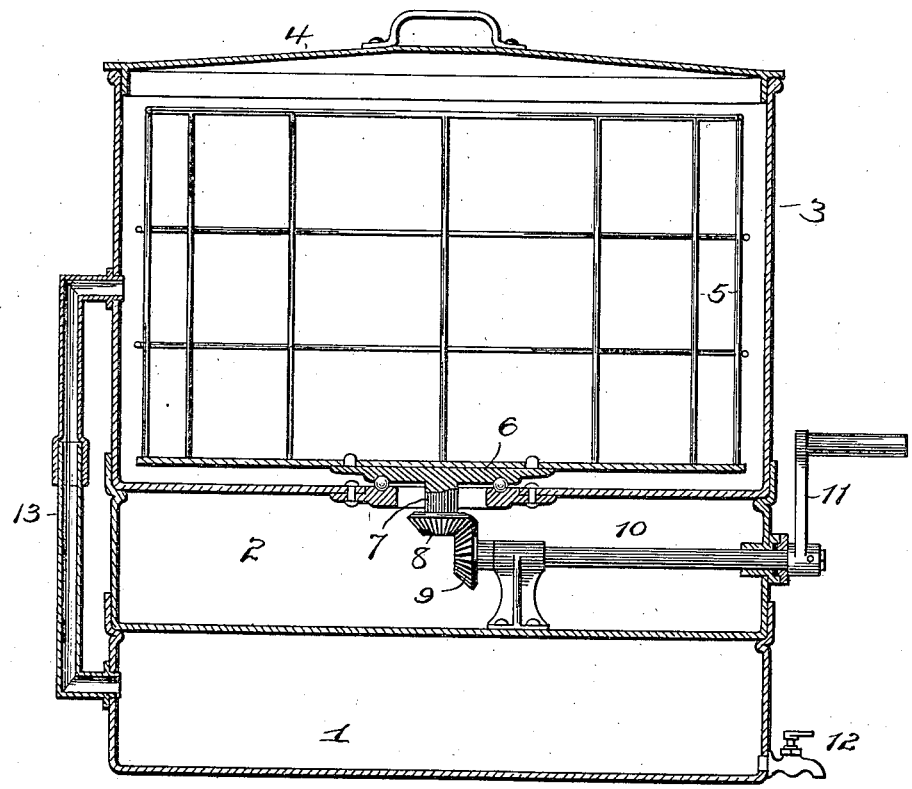
WITNESSES
INVENTOR
J. W. Pittock
By H. A. Seymour
Attorney

UNITED STATES PATENT OFFICE.

JOHN WILLIAM PITTOCK, OF PHILADELPHIA, PENNSYLVANIA.

WASHING APPARATUS.

No. 817,802.      Specification of Letters Patent.      Patented April 17, 1906.

Application filed September 12, 1905. Serial No. 278,133.

*To all whom it may concern:*

Be it known that I, JOHN WILLIAM PITTOCK, a resident of Philadelphia, in the county of Philadelphia and State of Pennsylvania, have invented certain new and useful Improvements in Washing Apparatus; and I do hereby declare the following to be a full, clear, and exact description of the invention, such as will enable others skilled in the art to which it appertains to make and use the same.

My invention relates to an improved washing apparatus, and more particularly to a portable apparatus for cleaning dishes, tableware, and the like, the object of the invention being to provide improvements of this character which can be placed upon a stove or other heater to generate steam and utilize the steam to clean the dishes; and the invention consists in certain novel features of construction and combinations and arrangements of parts, as will be more fully hereinafter described, and pointed out in the claims.

The accompanying drawing is a view in vertical section illustrating my improvements.

My improved apparatus comprises in the main three chambers or compartments—namely, a lower compartment 1 to rest on the stove or other heater, an intermediate compartment to fit snugly on compartment 1 and close the same, and an upper compartment 3, closing compartment 2 and having a removable cover 4, all of said compartments being readily separable whenever desired. Upper compartment 3 contains a cage or receptacle 5 for the articles to be washed, and this cage or receptacle is removably supported on a roller-bearing 6, having a journal 7 extending down into compartment 2 and having a beveled gear 8 thereon, with which a similar gear 9 on a horizontal shaft 10, supported in compartment 2, is in mesh. This shaft 10 projects outside of compartment 2 and has a suitable crank 11 thereon to facilitate its being turned to rotate the cage or receptacle 5. The lower compartment 1 is adapted to contain water, which may be drawn off through a cock 12 at one end, as shown, and this compartment when heated generates steam, which passes up through a pipe 13 into upper compartment 3, said pipe having telescoping sections, as shown, to permit the ready separation of the compartments, as may be desirable or necessary.

The operation of my improvements is as follows: As the water in lower compartment 1 is generated into steam it passes up the pipe 13 and is directed against the articles in the cage or receptacle 5 to clean them, and after they are thoroughly steamed and at the same time subjected to centrifugal action as the operator turns crank 11 the cock 12 is opened and the hot water remaining is drawn off and poured onto the articles in compartment 1, which water drains into the compartment 2, and the articles may be permitted to remain in the compartment 1 and be thoroughly dried by the heat and centrifugal force. The compartments can be separated and cleaned, as occasion may require, and the dirty water in compartment 2 can be emptied therefrom or drained through a suitable outlet, if desired.

A great many slight changes might be made in the general form and arrangement of the parts described without departing from my invention. Hence I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. In an apparatus of the character described, the combination of three superposed separable compartments, the lowest compartment comprising a steam-generator, the upper compartment an article-holder, and the intermediate compartment a drain-compartment, and a pipe connecting the top and bottom compartments for the passage of steam.

2. In an apparatus of the character described, the combination of a compartment for articles to be washed, a rotary article-holder in the compartment, a steam-generator, a pipe connecting the steam-generator and article-compartment, means for revolving the article-holder and means for draining the compartment containing the articles to be washed.

3. In an apparatus of the character described, the combination of three superposed removable compartments, each upper compartment closing the one next below, the lowest compartment forming a steam-generator, the upper compartment an article-holder and the intermediate compartment a drain-chamber, and a telescoping pipe connecting the bottom and top compartments.

4. In an apparatus of the character described, the combination with a water-chamber or steam-generator, of a drain-chamber on the steam-generator and forming a closure therefor, an article-compartment on the drain-chamber and having an opening in its bottom, a cover on the article-holder, a telescoping pipe connecting the steam-generator and article-holder, a rotary cage in the article-holder adapted to support the articles to be cleaned, a driving-journal therefor projecting into the drain-chamber and having a beveled gear thereon, a shaft supported in the drain-chamber and having a gear meshing with the first-mentioned gear, and an operating-crank on the outer end of said shaft.

In testimony whereof I have signed this specification in the presence of two subscribing witnesses.

JOHN WILLIAM PITTOCK.

Witnesses:
   C. S. TARVES,
   M. E. MORRISON.